United States Patent [19]
Curt et al.

[11] Patent Number: 6,131,132
[45] Date of Patent: *Oct. 10, 2000

[54] HIGH PERFORMANCE PERIPHERAL INTERFACE

[75] Inventors: Kenneth C. Curt, Saratoga; Edward J. Chejlava, Jr., San Bruno; Anthony Kozaczuk, Hayward, all of Calif.

[73] Assignee: Cirrus Logic, Inc., Austin, Tex.

[*] Notice: This patent is subject to a terminal disclaimer.

[21] Appl. No.: 08/459,561

[22] Filed: Jun. 2, 1995

Related U.S. Application Data

[62] Division of application No. 08/356,926, Dec. 14, 1994, abandoned, which is a continuation of application No. 07/964,590, Oct. 20, 1992, abandoned.

[51] Int. Cl.$^7$ .................................................. G06F 13/00
[52] U.S. Cl. .................................. 710/20; 710/7; 710/52
[58] Field of Search ...................................... 395/250, 275, 395/825–836, 840–841, 851–853, 872–881; 384/239.51, DIG. 1, DIG. 2; 710/5–10, 20–21, 31–33, 52–61, 129

[56] References Cited

U.S. PATENT DOCUMENTS

| | | | |
|---|---|---|---|
| 3,673,576 | 6/1972 | Donaldson, Jr. | 364/200 |
| 4,004,283 | 1/1977 | Bennett et al. | 364/200 |
| 4,145,751 | 3/1979 | Carlow et al. | 364/900 |
| 4,396,995 | 8/1983 | Grau | 364/900 |
| 4,443,846 | 4/1984 | Adcock | 364/200 |
| 4,447,878 | 5/1984 | Kinnie et al. | 364/200 |
| 4,453,229 | 6/1984 | Shaire | 364/900 |
| 4,490,784 | 12/1984 | Ives et al. | 364/200 |
| 4,683,534 | 7/1987 | Tietjen et al. | 364/200 |
| 4,716,527 | 12/1987 | Graciotti | 364/200 |
| 4,779,190 | 10/1988 | O'Dell et al. | 364/200 |
| 4,831,514 | 5/1989 | Turlakov et al. | 364/200 |
| 4,831,523 | 5/1989 | Lewis et al. | 364/200 |
| 4,860,244 | 8/1989 | Bruckert et al. | 354/900 |

(List continued on next page.)

FOREIGN PATENT DOCUMENTS

WO 92 15053  9/1992  WIPO .

OTHER PUBLICATIONS

Bursky, Dave, Drive Controller Simplifies Embedded ISA and EISA Interfaces:, Electronic Design, vol. 39, No. 19, Oct. 1991, Cleveland, OH, pp. 146–149, XP000275923.

Appian's News Release dated Nov. 8, 1991 on P928, "Appian Announces P928 FAST Local Bus Peripheral Interface Device."

Appian's VGA and IDE Benchmarks on P928 dated Nov., 1991.

Appian's BIOS Application Note by R. Kalish dated Dec. 17, 1991 on P928.

Appian's BIOS Application Note by Richard Kalish dated Jan. 2, 1992 on P928.

Appian's Fast Peripheral Interface Data Sheet dated Jan., 1992 on P928.

Appian's Fast Peripheral Interface Design Design Manual dated Apr., 1992 on P928.

Appian's Local Bus IDE Disk Interface Advanced Information Datasheet dated Jun., 1992 on AD12.

Appian's Fast Peripheral Interface Product Brief dated Jul., 1992 on P928.

(List continued on next page.)

*Primary Examiner*—Christopher B. Shin
*Attorney, Agent, or Firm*—Skjerven Morrill MacPherson Franklin & Friel; Dan Shifrin

[57] ABSTRACT

A high performance peripheral interface device is coupled to a computer via a computer bus and is coupled to a peripheral via a peripheral bus. To speed accessing of consecutively addressed data (the nth datum and the n+1th datum) from the peripheral, the interface device reads the n+1th datum from the peripheral: 1) before the computer has requested the n+1th datum from the interface device, and 2) while the computer is accessing the nth datum from the interface device.

1 Claim, 17 Drawing Sheets

U.S. PATENT DOCUMENTS

| | | | |
|---|---|---|---|
| 4,935,894 | 6/1990 | Ternes et al. | 364/900 |
| 4,958,271 | 9/1990 | Yoshida et al. | 364/200 |
| 4,972,364 | 11/1990 | Barrett et al. | 364/900 |
| 4,979,102 | 12/1990 | Tokuume | 364/200 |
| 5,014,236 | 5/1991 | Pogorzelski et al. | 364/900 |
| 5,073,969 | 12/1991 | Shoemaker | 395/725 |
| 5,079,693 | 1/1992 | Miller | 395/250 |
| 5,111,423 | 5/1992 | Kopec, Jr. et al. | 395/500 |
| 5,113,369 | 5/1992 | Kinoshita | 395/325 |
| 5,117,486 | 5/1992 | Clark et al. | 395/250 |
| 5,136,692 | 8/1992 | Barrett et al. | 395/280 |
| 5,191,657 | 3/1993 | Ludwig et al. | 395/500 |
| 5,220,651 | 6/1993 | Larson | 395/250 |
| 5,224,213 | 6/1993 | Dieffenderfer et al. | 395/250 |
| 5,239,636 | 8/1993 | Dujari et al. | 395/425 |
| 5,239,651 | 8/1993 | Sodos | 395/725 |
| 5,241,631 | 8/1993 | Smith et al. | 395/325 |
| 5,287,460 | 2/1994 | Olsen et al. | 395/275 |
| 5,293,623 | 3/1994 | Froniewski et al. | 394/425 |
| 5,307,320 | 4/1994 | Farrer et al. | 365/230.01 |
| 5,317,715 | 5/1994 | Johnson et al. | 395/425 |
| 5,335,329 | 8/1994 | Cox et al. | 395/275 |
| 5,379,382 | 1/1995 | Work et al. | 395/275 |
| 5,381,528 | 1/1995 | Brunelle | 39/250 |

OTHER PUBLICATIONS

Appian's Fast Peripheral Interface Design Manual Addendum dated Jul., 1992 on P928.

Appian's Fast Peripheral Interface Design Manual dated Aug., 1992 (Revision 2) on P928.

Appian's Local–bus IDE Interface Preliminary Information Packet dated Sep., 1992m on AD12.

Appian's News Release dated Sep. 14, 1992 on the AD12 Local Bus IDE Disk Interface Chip.

Appian's Applications Update #1 dated Oct. 6, 1992 on AD12.

Appian's Local Bus Peripheral Interface Product Brief dated Nov., 1992 on P928.

Appian's Engineering Sample Notice dated Nov. 23, 1992 on AD12.

HIGH PERFORMANCE PERIPHERAL INTERFACE

This application is a division of application Ser. No. 08/356,926, filed Dec. 14, 1994, abandoned which was a file-wrapper continuation of Ser. No. 07/964,590, filed Oct. 20, 1992, abandoned.

FIELD OF THE INVENTION

This invention relates to computer peripheral interfaces. More particularly, this invention relates to a high performance interface between a computer and at least one high data speed peripheral such as a Winchester hard disk drive or a high resolution color graphics display.

BACKGROUND OF THE INVENTION

The introduction of the general purpose microprocessor on a single integrated circuit (IC) into the marketplace resulted in the birth and development of inexpensive computers. These microprocessors included Zilog's Z80, and Intel's 8088. During the early development phase, different designs emerged with incompatible system architectures and operating systems. Apple Computer entered the market with the Apple One, and was followed by a number of other manufacturers such as Vector Graphics and Seattle Computer who introduced their own unique computers, using operating systems CP/M and DOS (the parent operating system of MS/DOS) respectively.

When International Business Machines (IBM) introduced the IBM Personal Computer (PC), based on Intel's 8088 and made its peripheral interface bus (IBM PC Bus) and Read Only Memory (ROM) Basic Input Output System (BIOS) public, it rapidly become the defacto industry standard. Many peripheral manufacturers began producing computer graphics and disk drive interface printed circuit boards (PCB) compatible with the IBM PC Bus. The next step of this evolution produced the IBM PC AT based on the 16-bit Intel 80286, which resulted in the expansion of the 8-bit based IBM PC Bus into a 16-bit peripheral interface bus for the IBM PC AT called the IBM AT ISA Bus. This path eventually lead to the 32-bit world of the 80386 and the 80486, with the ISA Bus remaining the defacto standard interface for peripheral devices. Meanwhile, peripheral device performance and microprocessor speeds continued their rapid increase and as a result, the ISA Bus is now a bottleneck and a serious impediment to improved performance of the PC as a whole.

The early Winchester hard disk drives developed for PCs has data burst rates of about 0.5 Mbits/sec and mean seek time of 100 msecs, which the ISA bus was able to service fairly efficiently. However, after over a decade of rapid development, hard disk drives are now capable of data burst rates of over 10 MBytes/sec and mean seek times of under 12 msecs. Increasingly, "intelligent" circuitry was added to the hard drives and another defacto peripheral interface standard soon gained wide acceptance. This standard is known as the Integrated Device Electronics interface bus (IDE Bus) and is the interface between a hard disk drive and a simplified conventional hard disk controller card. The disk controller card is in turn coupled to the computer via the ISA Bus. Eventually, the IDE Bus became the ANSIS-ATA standard proposal currently evolving but adopted by most manufacturers. The IDE interface is a 40-pin flat cable format and is capable of supporting data burst rates possibly exceeding 20 MByte/sec. In contrast, the conventional ISA interface can theoretically support burst rates of 5 MByte/sec on the programmed I/O cycles generally used for disk drive operations but in practice a typical ISA IDE disk drive only achieves an average data transfer rate of less than 1 MByte/sec typically.

FIG. 1 shows a block diagram of the conventional IDE hard disk interface between the Central Processing Unit (CPU) 1 of the computer and a pair of hard drives 10 & 11. Various I.C. manufacturers such as Chips & Technologies produce versions of a PC chip set 2 to convert non-standard CPU signals into ISA Bus signals. Additionally, an ISA Interface 5 provides a second level of minor protocol conversion between the ISA Bus and the IDE Bus interface to the hard disks 10 & 11. The ISA Interface 5 includes a register such as an LS244 which provides system compatibility with a floppy drive (not shown).

However, because of the data transfer speed limitations imposed by the ISA Bus standard, of 8 MHz, there is very little incentive to produce hard drives with higher data transfer rates. As a result, most of recent improvements to the hard drive technology have been concentrated in the area of physical size reduction and increased data capacity. Therefore the introduction of a new high performance peripheral interface standard will enable the faster CPU of the computer or microprocessor in the computer to take advantage of faster hard drives already available today and further create an incentive for hard drive manufacturers to increase data transfer rates.

Meanwhile, in the field of computer graphics, a very similar evolution was taking place. Early PC monochrome graphics cards based on the monochrome display adapter (MDA) had no graphics capabilities and could only display text. This was followed by the Color Graphics Adapter (CGA) with 4 color graphics capability. In contrast, today's Enhanced Graphics Adapter (EGA), Video Graphics Array (VGA) and the Super VGA (SVGA) are capable of both text and higher resolution graphics. As a result, a new class of multifrequency displays were introduced, starting at EGA resolution (640*350) and going up to 640*400, 640*480, 800*600, 1024*768, or even higher. In addition to the higher resolution, multifrequency displays also offer more colors. When operated in a digital mode, they have 64 color capability.

FIG. 2 shows a block diagram of a conventional interface between the CPU 1 and the graphics display device 20. The PC chip set 2 provides an interface between the CPU bus and the ISA bus. Additionally, a VGA Interface Controller 6 provides a second level of protocol conversion between the ISA Bus and the VGA Bus interface to the graphics display device 20.

The two techniques commonly used for storing color information are the packed pixel method and the color plane method as illustrated in FIGS. 3a and 3b respectively. A pixel is a dot having an X-Y position defined on the graphics display. Both VGA and SVGA define color plane oriented devices and also support emulation modes that use packed pixels. With packed pixels, all the color information for a pixel is packed into one word of memory data. With the color plane approach, the display memory is separated into several independent planes of memory, with each plane dedicated to controlling one color component (such as the primary colors red, green or blue). Each pixel occupies one bit position in each color plane. The color plane method makes more efficient use of the display memory. Nevertheless, in both the packed pixel and the color plane methods, a large amount of display memory space is needed to support color graphics applications, and there exists a potential for a high volume of pixel data read/write requests by the CPU to the display memory.

This is because the VGA and many SVGA implementations, like its predecessors, are non-intelligent display device standards; i.e. they have no on-board drawing or processing capability. The CPU is responsible for computing any changes required in the display and drawing directly into display memory in real-time. Hence there is potentially a very high volume of data that must be read from or written by the CPU to and from the display memory, all of which must pass through the peripheral interface between the CPU and the display memory. Therefore it is increasingly clear that the ISA bus is inadequate for today's real-time computer graphics applications requiring high speed and high volume transfer of data, such as three dimensional simulation of a number of mechanical moving parts in real-time or the animation used in the movie industry.

Hence there is an urgent need for a new high performance peripheral interface capable of keeping up with the demands of today's 32-bit microprocessors running at typical speeds of 50 MHz and accessing high performance peripherals such as high speed hard drives and high resolution graphics displays.

A consortium of video equipment manufacturers has collectively agreed to support a new standard for the CPU local bus which is substantially faster than the IBM AT ISA Bus. This new standard has been named the Video Electronic Standard Association (VESA) VL-Bus.

DETAILED DESCRIPTION OF THE DRAWINGS

SUMMARY OF THE INVENTION

In accordance with the invention, prior art difficulties resulting in the inability to efficiently exploit the data transfer bandwidth capability of high performance peripheral devices and high speed computer local buses, due to inefficient handshaking protocols and serial read/write transfer operations, are overcome by pipelining data transfers using Read-Ahead and Posted-Write modes of operation.

Efficiency of Read-Ahead operations is further enhanced by maintaining a countdown of the number of words of a 512-byte data sector already transferred in an IBM PC or compatible, and automatically fetching the next "chunk" of data from the peripheral device. In addition, the Local Bus Peripheral Interface (LBPI) also "snoops" the peripheral device commands from the computer to intelligently predict address locations of subsequent read data transfers.

To accomplish all of the above, the LBPI which is coupled between the computer local bus and the peripheral interface (s), is provided a pipelined architecture which includes a Read Ahead Buffer, a Read Ahead Counter, a Data Out Latch, and a Controlling State Machine with a Configuration Register.

The Controlling State Machine also "snoops" the peripheral device commands to maintain its record of the operating parameters of the peripheral devices and also keeps track of which of the devices is currently active.

DETAILED DESCRIPTION OF THE INVENTION

Figure 1:
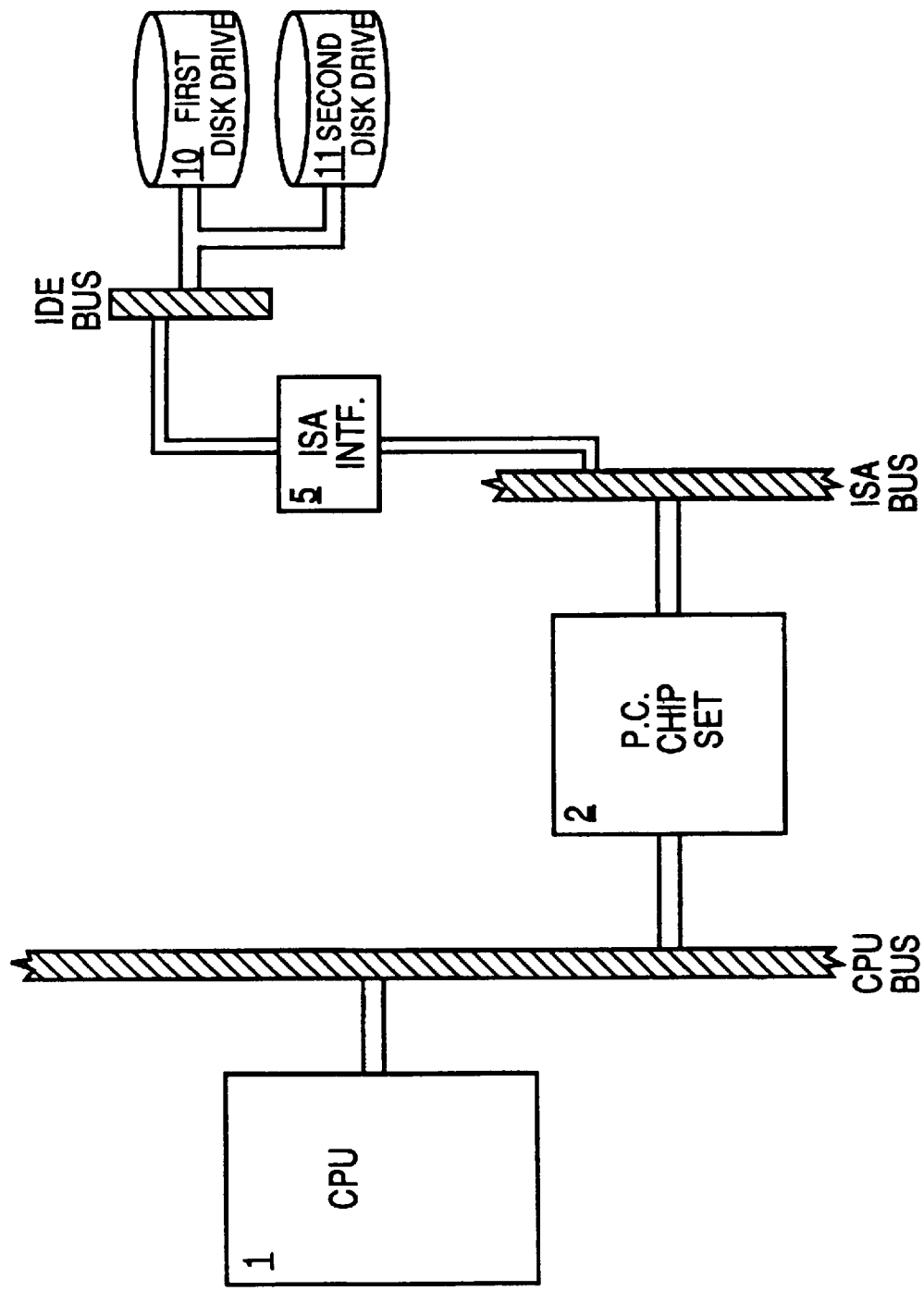
FIG. 1 shows a block diagram of the conventional AT ISA interface between a CPU and a pair of hard drives (PRIOR ART).
Figure 2:
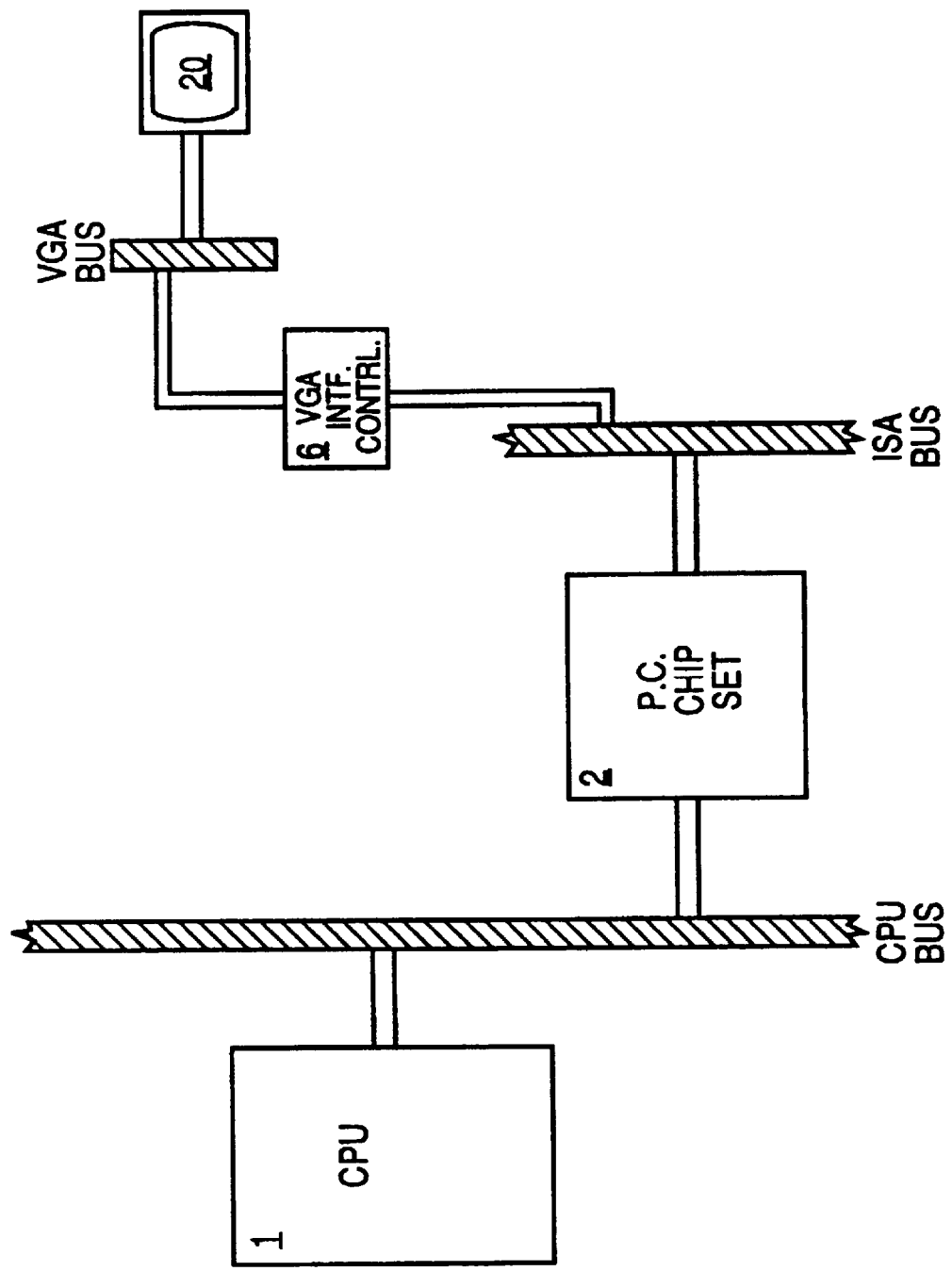
FIG. 2 shows a block diagram of the conventional AT ISA interface between a CPU and a graphics device (PRIOR ART).
Figure 3A:
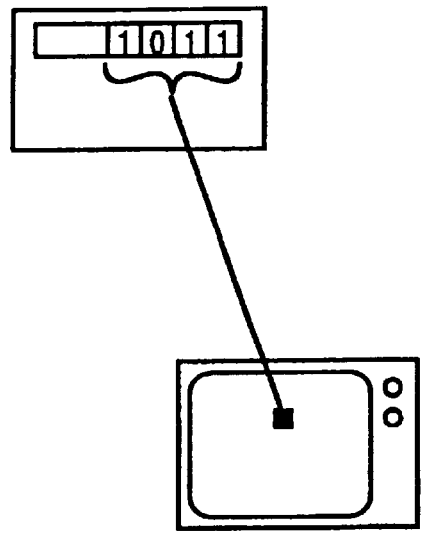
FIG. 3a illustrates the packed pixel method of storing color information in memory (PRIOR ART).
Figure 3B:
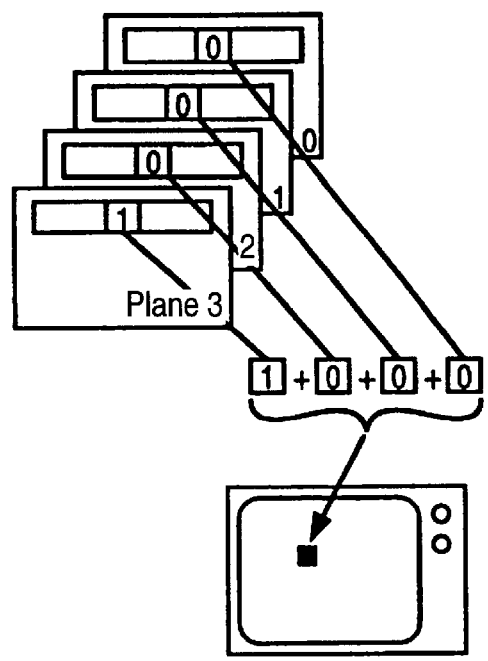
FIG. 3b illustrates the color plane method of storing color information in memory (PRIOR ART).
Figure 4:
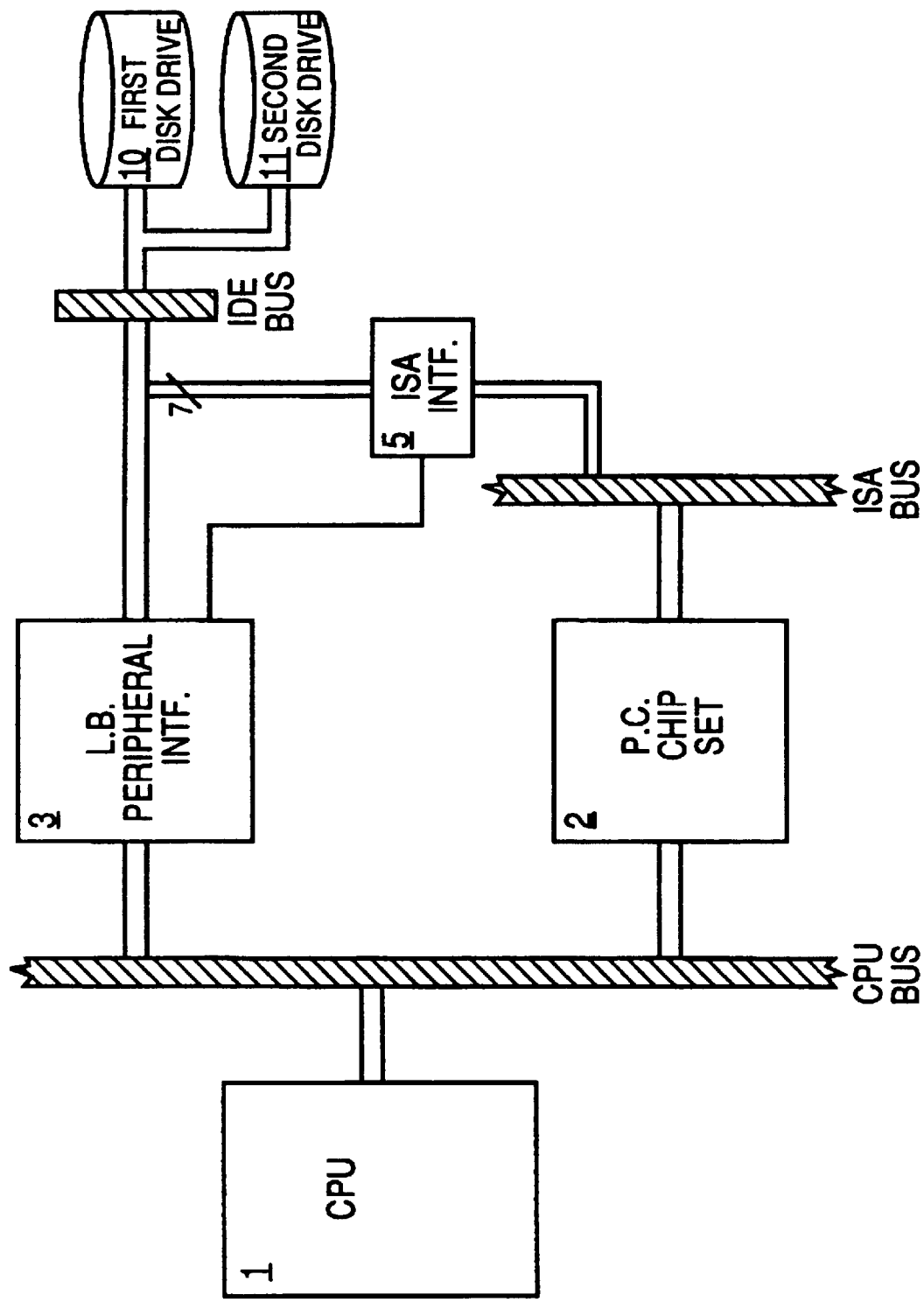
FIG. 4 shows a block diagram of a first embodiment of a Local Bus Peripheral Interface (LBPI) between a CPU and a pair of hard drives.

FIG. 4 shows a block diagram of a first embodiment of the Local Bus Peripheral Interface (LBPI) 3 between a CPU 1 and a pair of hard drives 10 & 11 in accordance with the invention. The LBPI 3 provides protocol conversion between the CPU local bus and the IDE bus interface to the hard disks 10 & 11. An ISA Interface 5 provides system compatibility at I/O address 3F7 for a conventional PC with a floppy drive on the ISA bus.

Figure 7:
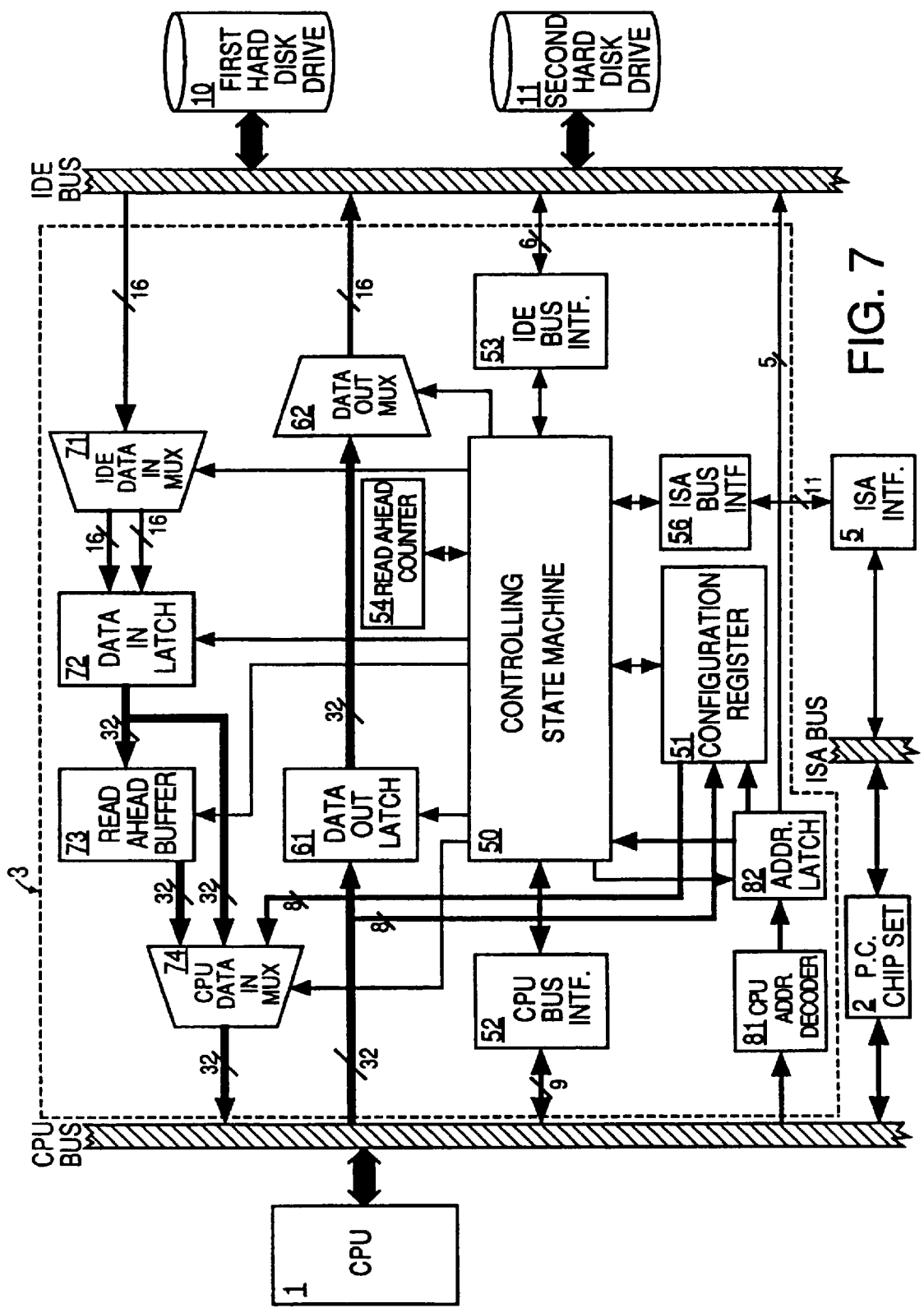
FIG. 7 shows a detailed block diagram of the first embodiment of the LBPI circuitry between a CPU and a pair of hard drives.

FIG. 7 shows a more detailed block diagram of the first embodiment of the LBPI 3 circuitry between a CPU 1 and a pair of hard drives 10 & 11, and illustrates those functional blocks relevant to analyzing system level concurrency from programmed I/O data transfers as it relates to the LBPI 3.

Note that the LBPI 3 has full control of its IDE (ATA) bus and can perform transfers over that IDE bus independently of other computer system operations.

Figure 12:
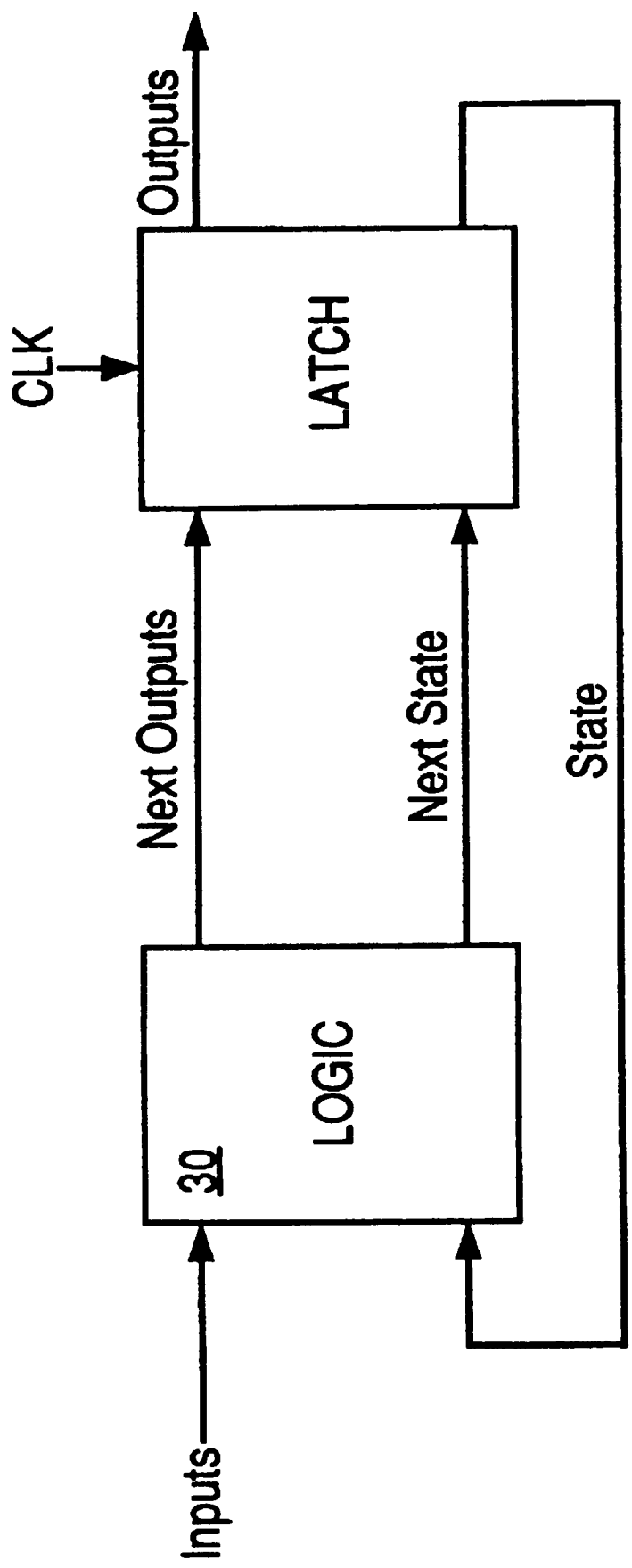
FIG. 12 shows a block diagram of one of the state machines within the Controlling State Machine of the first embodiment.
Figure 13:
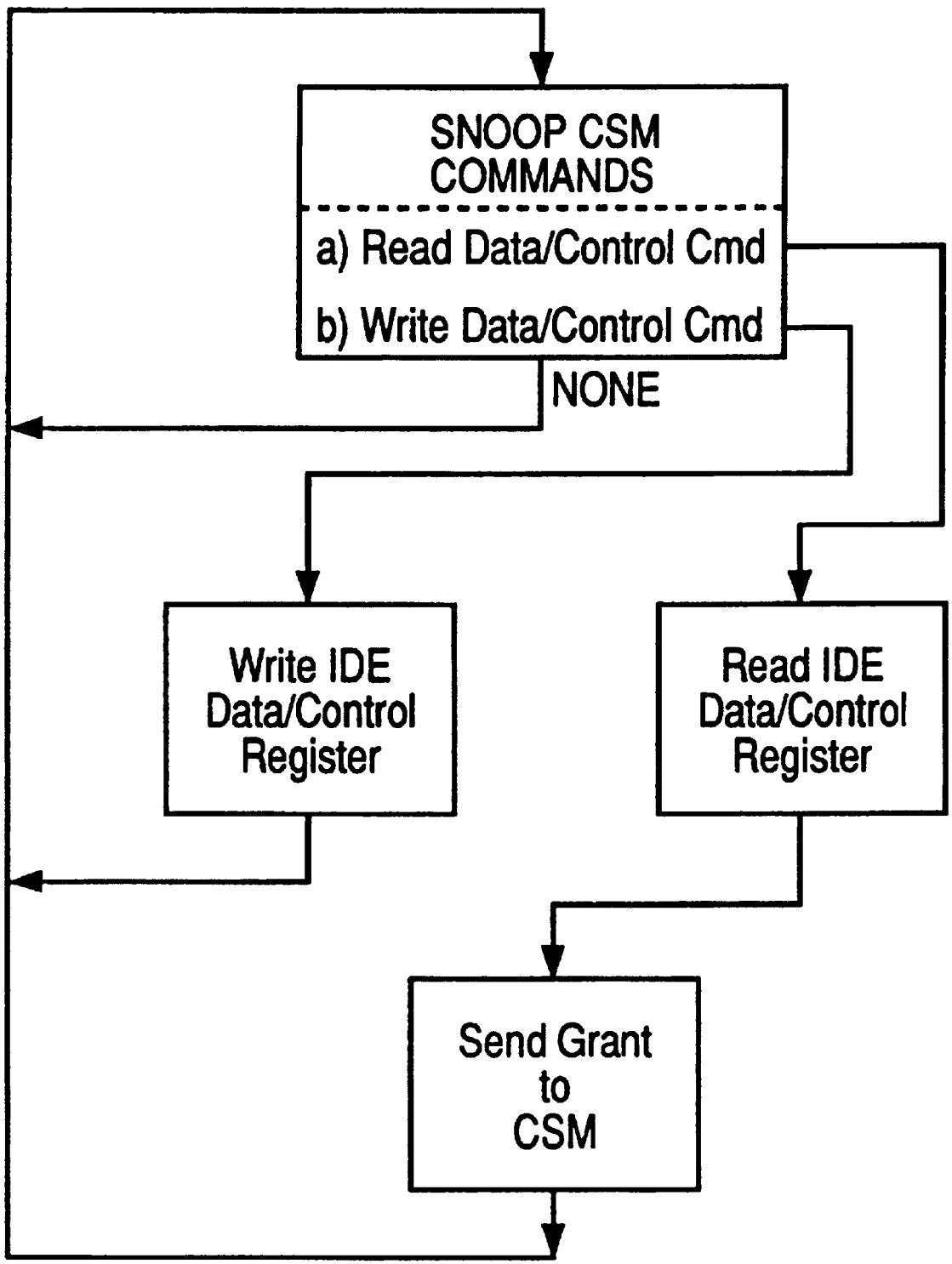
FIG. 13 shows a flow diagram of the IDE-side State Machine (ISM) portion of the Controlling State Machine of the first embodiment.

FIG. 12 shows one of the state machines within the Controlling State Machine of the first embodiment. Hard wired Logic 30 provides the control sequences for the LBPI configuration commands, disk drive control commands, disk read and write commands. FIG. 13 shows a flow diagram of the ISM and FIGS. 14a, 14b, 14c and 14d show the flow diagrams of the CSM of the first embodiment.

Referring again to FIG. 7, the Controlling State Machine 50 is coupled to the CPU local bus and the IDE Bus via a CPU Bus Interface 52 and an IDE Bus Interface 53 respectively. The CPU Bus Interface signals include ADS, CLK, CPURDY, CPURST, LDEV, LRDY, MIO, DC and WR. The IDE Bus Interface signals include DIOR, DIOW, DRDY, DRST, DCS16 and DINT. This Controlling State Machine 50 provides a plurality of control signals for the configuration, read and write operations.

The LBPI 3 has a Configuration Register 51 comprising of sixteen 8-bit registers. These registers store the LBPI parameters such as disk drive transfer rates and also a copy of the floppy compatibility register at 3F7h. Only three I/O port addresses are required for LBPI configuration purposes. These three I/O addresses can also be shared by up to four LBPIs on the same CPU local bus. Further, the I/O addresses are selectable to provide flexibility for different computer systems.

In order to maintain compatibility with computer systems with floppy drive(s) attached via the ISA Bus, an ISA Bus Interface 56 is also provided to couple the State Machine 50 to the ISA Interface 5. The ISA Bus Interface signals include IOCHRDY, IIOR, IRQ14 and RESET. Alternatively, on systems where both the hard drive IDE circuitry and the floppy drive circuitry are on the same printed circuit board, such as a "note book" computer, the ISA Interface 5 is not utilized by the LPBI 3.

Note that the LBPI State Machine 50 continuously "snoops" the control signals from the CPU 1 to the disk drives 10 and 11 to detect and to keep track of which of the disk drives 10 or 11 is currently active. This LBPI feature gives it the ability to automatically and dynamically toggle between two sets of timing parameters of disk drives 10 & 11 which in turn set signal timing for controlling data transfer rate. This capability allows the LBPI 3 to provide optimized performance for any pair of drives connected to it.

The LBPI 3 has control logic within the State Machine 50 which can make this decision without any additional special driver software, i.e. using only the generic PC BIOS code. This is a very advantageous feature since in a typical PC system this information is not available outside the disk drive unit.

The term "snoop" is used to mean that the LBPI 3 watches the address and data during the transfer but does not affect or participate in the transfer, other than to provide the data path from the CPU to the drive In a conventional IBM PC AT or a compatible, the disk drive Drive/Head register is at system address 01F6h, with bit 4 containing the status of which drive is active. If this bit is 0, then drive 0 is active, and if this bit is 1, then drive 1 is active. Hence by "snooping" the transfers to the 01F6h register and recording the data in bit 4 of the disk drive register, the LBPI 3 is able to determine the current destination of the disk drive commands and hence maintain a record of the status of the currently active disk drive.

Figure 14A:
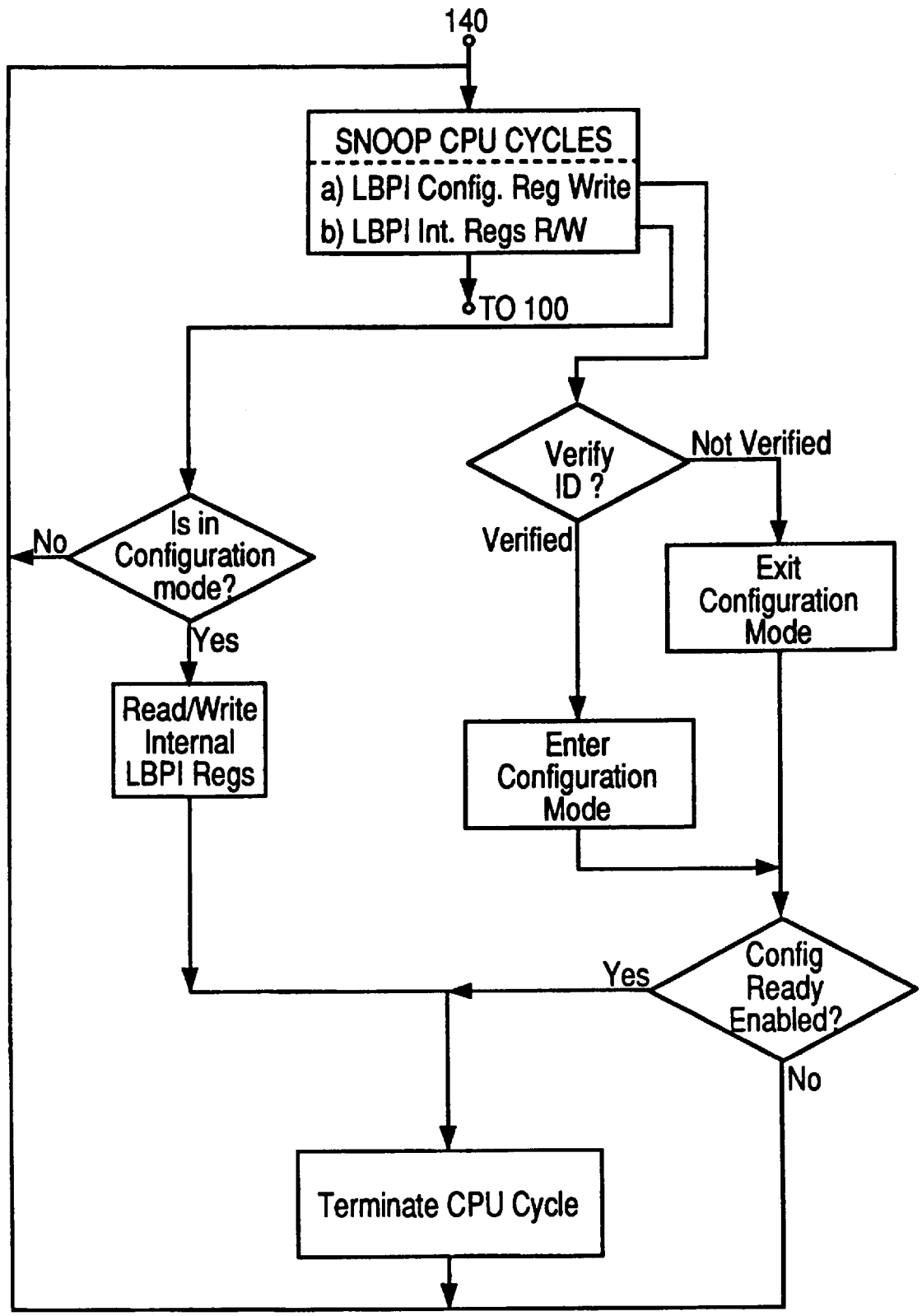
FIGS. 14a, 14b, 14c and 14d show the flow diagrams of the CPU-side State Machine (CSM) portion of the Controlling State Machine of the first embodiment.
Figure 14B:
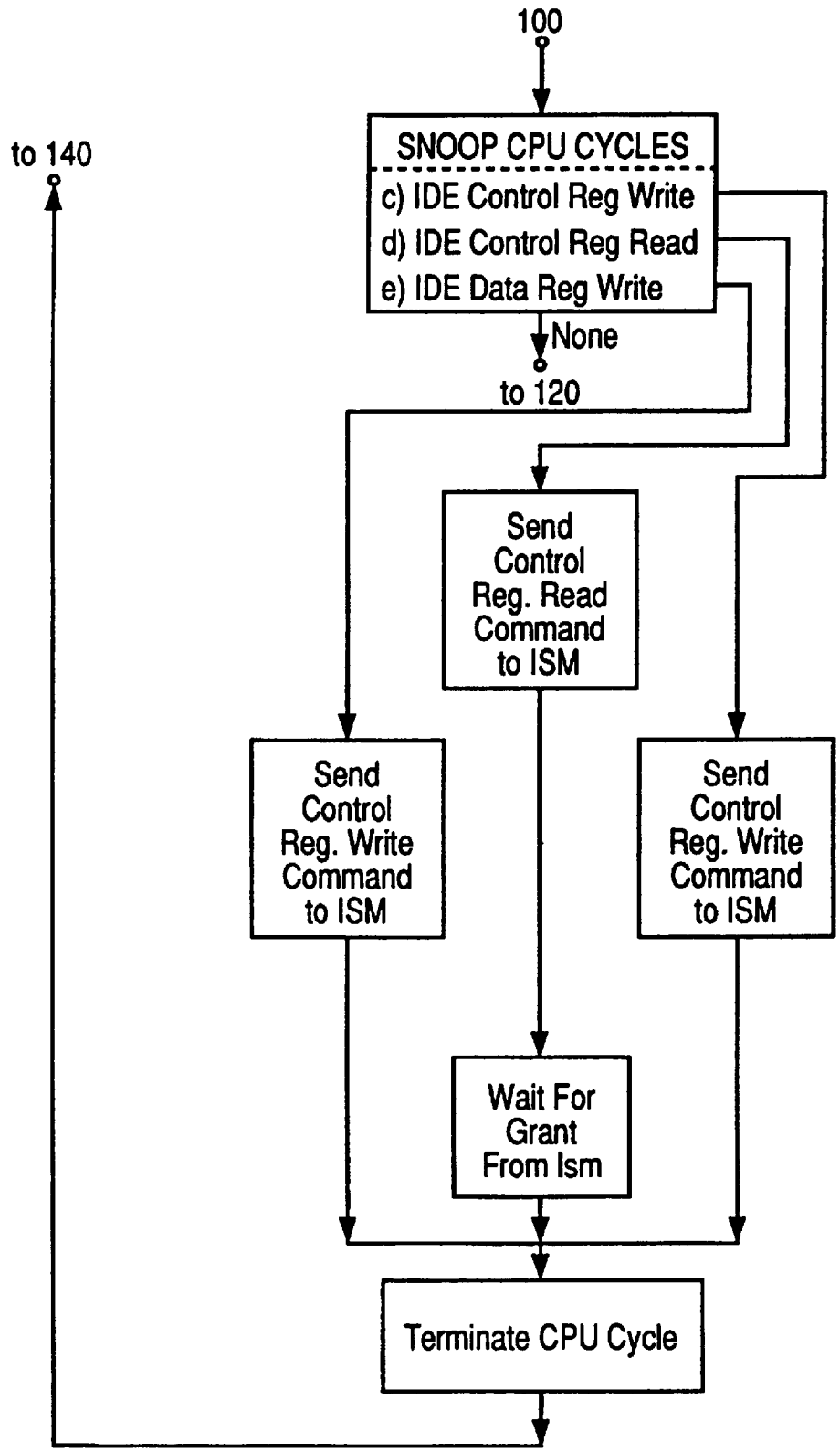
Figure 14C:
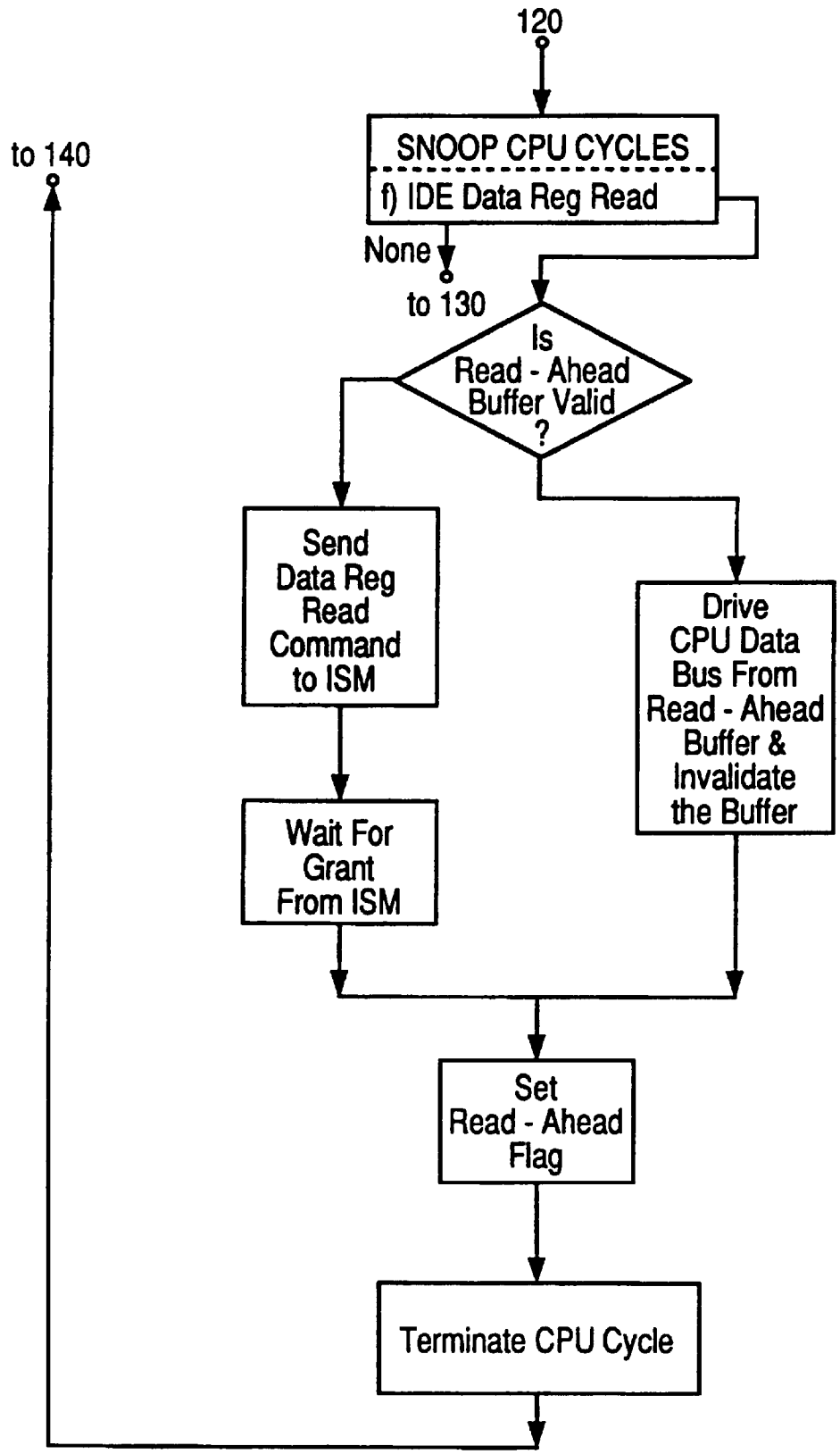
Figure 14D:
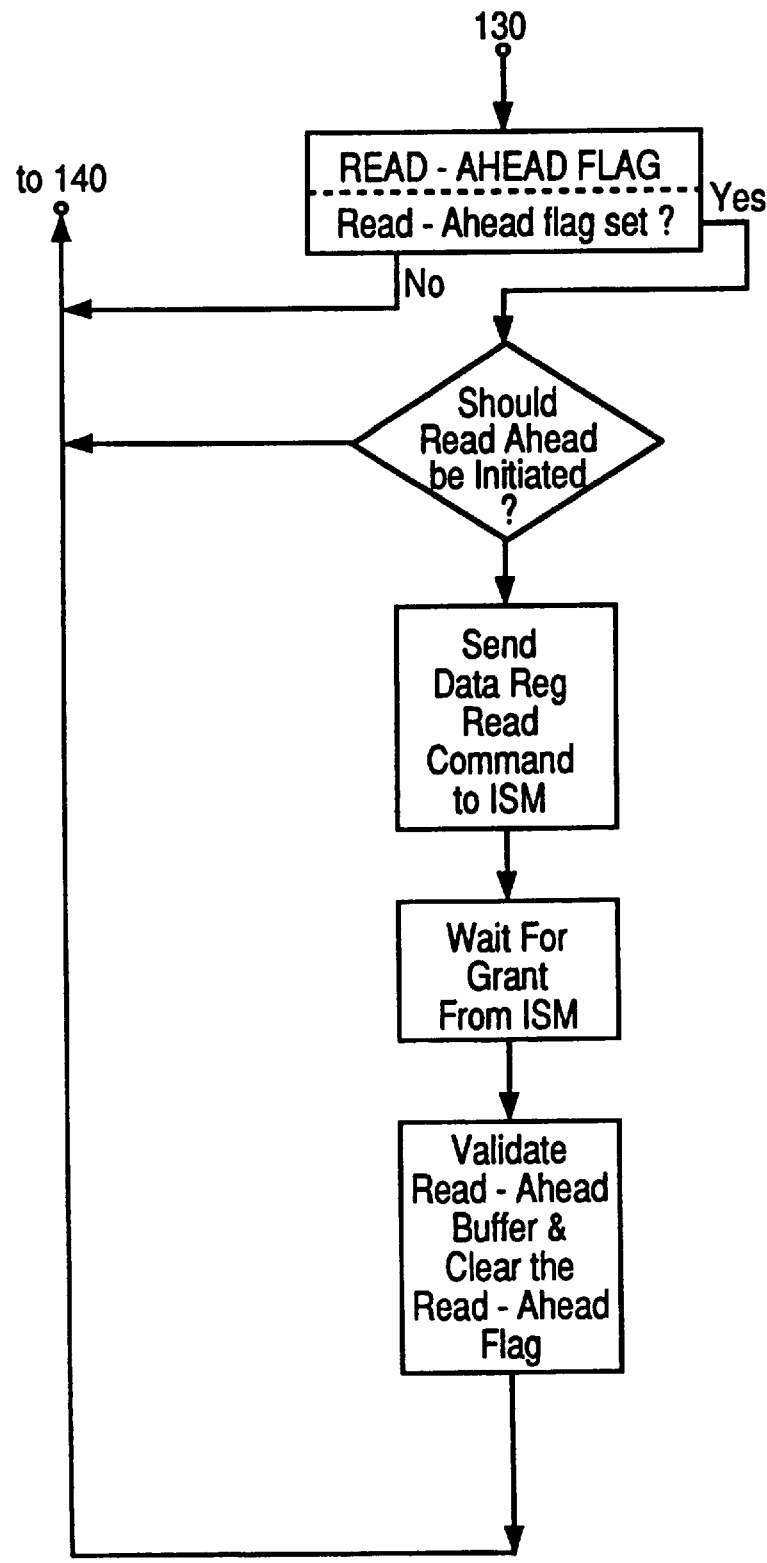

The other interconnections and interactions of the various data and address processing blocks to accomplish the pipelined operation of the LBPI 3 are best illustrated by ISM and CSM flow diagrams of FIGS. 13–14d and descriptions of Configuration, Disk Read and Disk Write operations performed by the LBPI 3 circuitry.

In a PC AT or compatible computer, a common method of data transfer to and from an IDE style hard disk drive is using "programmed I/O". Programmed I/O refers to a method where the CPU is directed by software to perform a read data operation followed by a write data operation to transfer data between a source and a destination. This technique was used for hard disk data transfers by IBM in their first PC AT systems and has continued as a standard capability in all PC compatibles today.

Figure 8A:
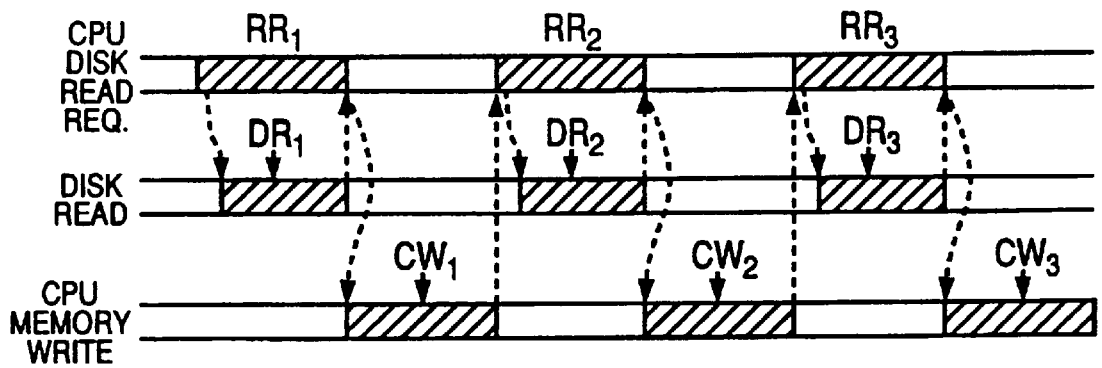
FIG. 8a shows three complete conventional ISA Bus disk read cycles wherein the CPU Memory Write is slower than the Disk Read (PRIOR ART).

FIG. 8a is a time line diagram showing three complete conventional ISA Bus disk read cycles wherein the CPU Memory Writes $CW_1$, $CW_2$ & $CW_3$ are slower than the Disk Reads $DR_1$, $DR_2$ & $DR_3$, using programmed I/O via the ISA Bus in a conventional PC system. The diagram shows a sequence of events with time increasing along the horizontal axis from left to right. Note that each Disk Read Request $RR_1$, $RR_2$ & $RR_3$ precede each Disk Read operation $DR_1$, $DR_2$ & $DR_3$, which in turn precedes each CPU Memory Write operation $CW_1$, $CW_2$ & $CW_3$ respectively.

For example, if disk drive 10 is selected and there is a data request from the CPU 1 to disk drive 10, a Disk Read Request $RR_1$ is sent to the disk drive 10. In response to the Request $RR_1$ the disk drive performs a Disk Read $DR_1$ and supplies data to the CPU 1. After the CPU 1 receives the data, it writes the data to the CPU memory during period $CW_1$. After the memory has accepted the data, the CPU 1 can then send a second Disk Read Request $DR_2$ for more disk data, and the sequence repeats itself in a similar serial manner until all the data required by the application software has been provided.

Figure 8B:
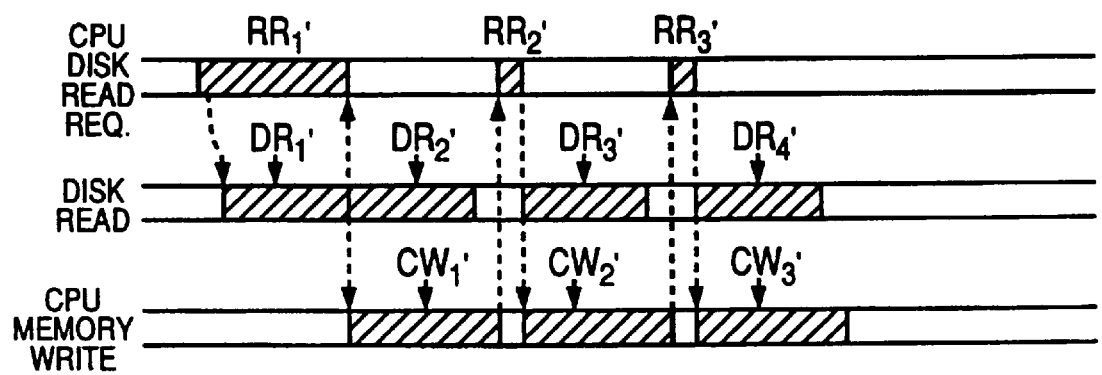
FIG. 8b shows three complete LBPI disk read cycles wherein the CPU Memory Write is slower than the disk read in accordance with the first embodiment.

FIG. 8b shows three complete LBPI disk read cycles in accordance with the first embodiment of the invention, wherein the CPU Memory Writes $CW_1$', $CW_2$' & $CW_3$' are slower than the Disk Reads $DR_1$', $DR_2$' & $DR_3$'. Again, a programmed I/O data transfer is initiated by the CPU 1. However, now the data transfer is via the faster Local Bus and the LBPI 3 is operating with a read-ahead mode enabled. FIG. 8b shows three horizontal lines of activity, with both the CPU 1 and one of the Disk Drives 10 or 11 are performing different operations simultaneously to yield a significant improvement in overall data transfer rate (speed).

For example, if disk drive 10 is active and there is a data request from the CPU 1 to disk drive 10, the first data transfer occurs just as in FIG. 8a. The CPU 1 sends a Disk Read Request $RR_1$' to the disk drive 10 with the LBPI 3 passing the Request $RR_1$' to the disk drive 10. The disk drive 10 performs a Disk Read $DR_1$' and supplies the data to the CPU 1 through the LBPI 3 and the Local Bus. After the CPU 1 receives the data it performs a CPU Memory Write $C_{W1}$ to memory.

One of the advantages of the invention over the conventional ISA Bus PC system is the ability of the LBPI 3 to automatically begin reading the next "chunk" of data during $DR_2$' from the disk drive 10, while the CPU is still writing the first "chunk" of data to the CPU memory. This reading ahead is a first of four LBPI Read-Ahead modes in operation and represents the system level concurrency that the LBPI 3 can provide. The new disk data is stored in the Read Ahead Buffer 73 until the CPU requests it.

Since PC DOS organizes data in 512-byte sectors, there is a very high probability that the next 16 bits of data to be requested is also the next contiguous 16 bits on the disk drive within the 512-byte sector. Referring back to FIG. 7, by using the Read-Ahead feature and maintaining a count of the number of 16-bit words already read in the Read Ahead Counter 54, the LBPI 3 can further increase the speed of disk reads by using the LBPI disk read pipeline comprising of the IDE Data In Latch 72 and the Read Ahead Buffer 73, to read and hold the next 16-bit word "chunk" in anticipation of the next Disk Read Request.

The system handshaking between the CPU 1 and the LBPI 3 for a disk read occurs in the following manner. When the LBPI 3 detects a read address match in the IDE hard disk range, it first sends a LDEV signal to the CPU 1 through the CPU Bus Interface 52. This signals the CPU 1 that there is a local bus device that will communicate during the data transfer cycle and has the effect of preempting a conventional ISA Bus cycle. If the data is already in the Read Ahead Buffer 73, the LBPI 3 outputs the data to the CPU 1 and pulls the LRDY line low via the CPU Bus Interface 52. On the other hand, if the data is not in the Read Ahead Buffer 73 and the CPU 1 requests a 16-bit word transfer, the LBPI 3 internally generates one IDE Disk Read to read a 16-bit word via an IDE Data In Multiplexer (MUX) 71 and a Data In Latch 72, from the selected disk driver 10 or 11. If the CPU requests a 32-bit word, then the LBPI 3 internally generates two IDE Disk Read to read a 32-bit word, in two 16-bit "chunks" via the same data path but latches the two 16-bit "chunks" as a high word and a low word into the Data In Latch 72. After the data is transferred through the CPU Data In MUX 74 to the CPU local bus, the LBPI 3 signals the CPU 1 by pulling the LRDY Line low.

The LBPI 3 also has three other Read-Ahead modes of operation. The second Read-Ahead mode is the Read-ahead Command Monitor mode. In this mode, the LBPI 3 not only watches for a disk drive address match, it also watches or "snoops" the disk drive commands from the CPU 1. In order to set up a disk drive operation, the CPU 1 has to send commands to the IDE disk drive(s) such as Read-Long, Read-Sector, Read-Buffer, Read-Multiples, etc. For example, prior to reading a new data sector, the CPU 1 has to send commands to the disk drive, which includes information about the new sector location and the type of disk read operation. These commands are passed along by the LBPI 3 to the disk drives and more importantly are also used by the Controlling State Machine 50 to anticipate when the selected disk drives 10 or 11 is about to receive the next read data command. The LBPI 3 is then able to generate its next Read Disk command to the disk drive at the appropriate time, in anticipation of the next Read Disk command from the CPU 1. In this command mode, the Read Ahead Counter 54 is used as in the first Read Ahead Mode. Commands that generate read-ahead activity are Read-Sectors-With-Retry, Read-Sectors-Without-Retry, Read-Buffer and Read-Multiple. This is the most flexible of the four Read-Ahead modes.

The third Read-ahead mode is a diagnostic mode in which the Read Ahead Counter 54 is ignored. The LBPI 3 continuously reads the next "chunk" of data from the disk drive and ignores the Read Ahead Counter 54. The fourth Read-ahead mode allows the LBPI 3 to dynamically program the count in the Read Ahead Counter 54. Another feature of the read-ahead mode is that data is always supplied from the same I/O address location on each transfer, thereby maintaining compatibility with the generic PC BIOS code.

Figure 9A:
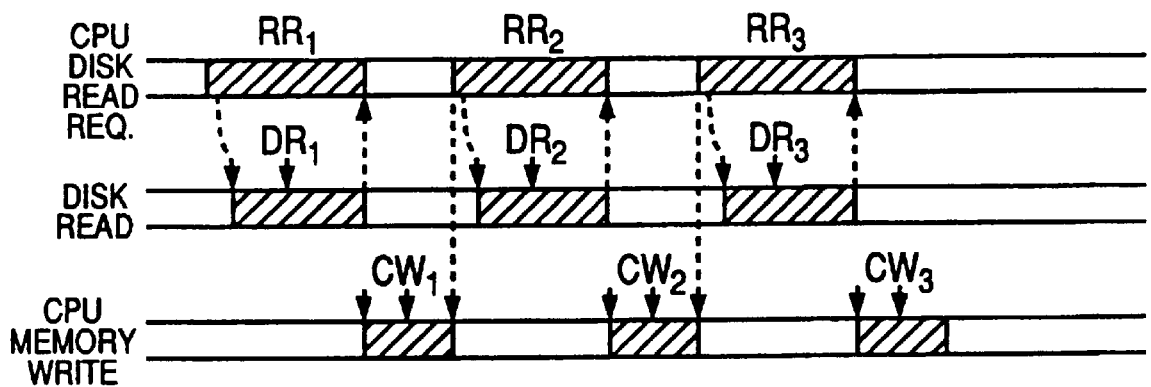
FIG. 9a shows three complete conventional ISA Bus disk read cycles wherein the CPU Memory Write is faster than the Disk Read (PRIOR ART).

FIG. 9a shows three complete conventional ISA Bus disk read cycles wherein the CPU Memory Writes $CW_1$, $CW_2$ & $CW_3$ are faster than the Disk Reads $DR_1$, $DR_2$ & $DR_3$, using programmed I/O via the ISA Bus in a conventional PC system. The sequence of serial events are performed in a very similar serial manner to that of FIG. 8a with each Disk Read Request $RR_1$, $RR_2$ & $RR_3$ preceding each Disk Read operation $DR_1$, $DR_2$ & $DR_3$, which in turn precedes each CPU Memory Write operation $CW_1$, $CW_2$ & $CW_3$ respectively.

Figure 9B:
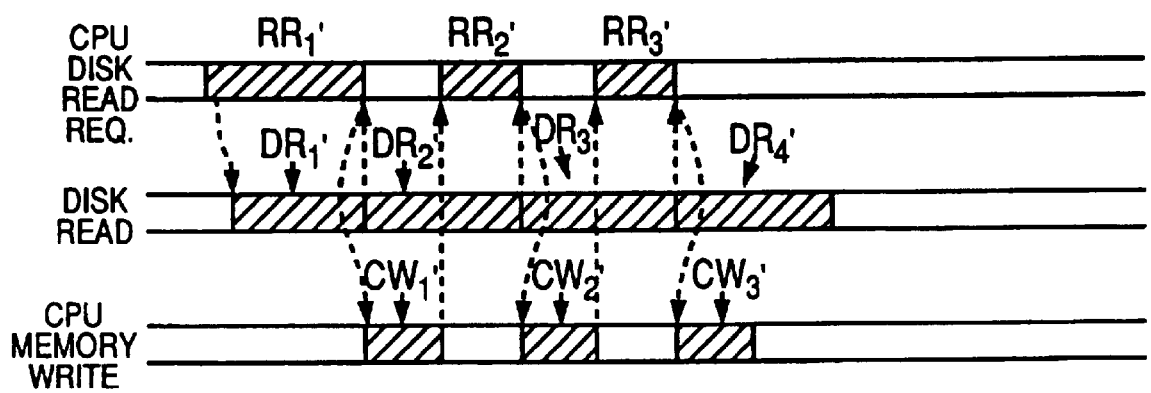
FIG. 9b shows three complete LBPI disk read cycles wherein the CPU Memory Write is faster than the Disk Read.

FIG. 9b shows three complete LBPI disk read cycles wherein the CPU Memory Writes $CW_1'$, $CW_2'$ & $CW_3'$ are faster than the Disk Reads $DR_1'$, $DR_2'$ & $DR_3'$ in accordance with the first embodiment of the invention. Again, a programmed I/O data transfer is initiated by the CPU 1. However, now the data transfer is via the faster CPU local bus and the LBPI 3 is operating with a read-ahead mode enabled, and with both the CPU 1 and one of the Disk Drive 10 or 11 is performing different operations simultaneously.

For example, if disk drive 10 is active and there is a data transfer request from the CPU 1 to disk drive 10, the first data transfer occurs just as in FIG. 9a. However, now the LBPI 3 automatically begins reading the next "chunk" of data during $DR_2'$ from the disk drive 10, while the CPU is still writing the first "chunk" of data to the CPU memory. The new disk data is stored in the Read Ahead Buffer 73 until the CPU requests it.

FIGS. 8b and 9b show somewhat idealized event sequences. Since either the memory, CPU, or disk drive, will be a slower device (the performance bottleneck), the LBPI 3 will insert "dead" periods to guarantee that the event sequence is not corrupted.

Figure 10A:
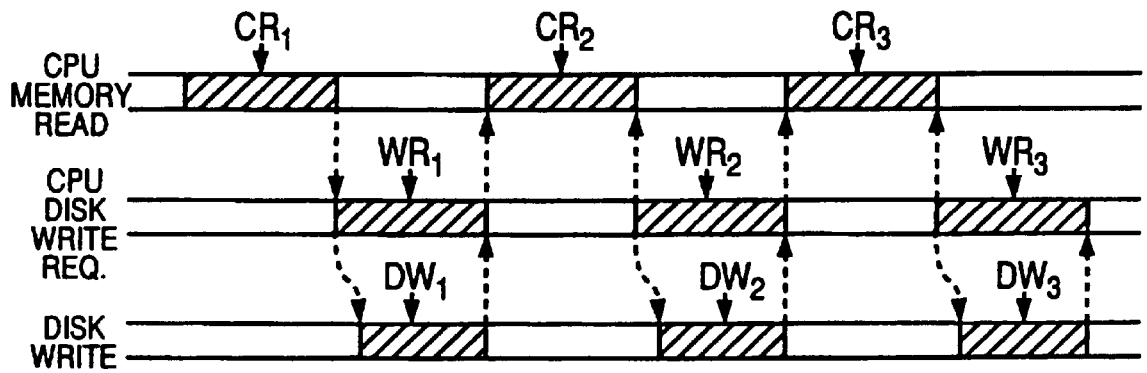
FIG. 10a shows three complete conventional ISA Bus disk write cycles wherein the CPU Memory Read is slower than the Disk Write (PRIOR ART).

FIG. 10a shows three complete conventional ISA Bus disk write cycles wherein the CPU Memory Reads $CR_1$, $CR_2$ & $CR_3$ are slower than the Disk Writes $DW_1$, $DW_2$ & $DW_3$. The sequences of serial events are very similar to the conventional read cycles using the ISA Bus, with the CPU Memory Reads $CR_1$, $CR_2$ & $CR_3$ preceding the Disk Write Requests $WR_1$, $WR_2$ & $WR_3$, which in turn precedes the Disk Writes $DW_1$, $DW_2$ & $DW_3$.

Figure 10B:
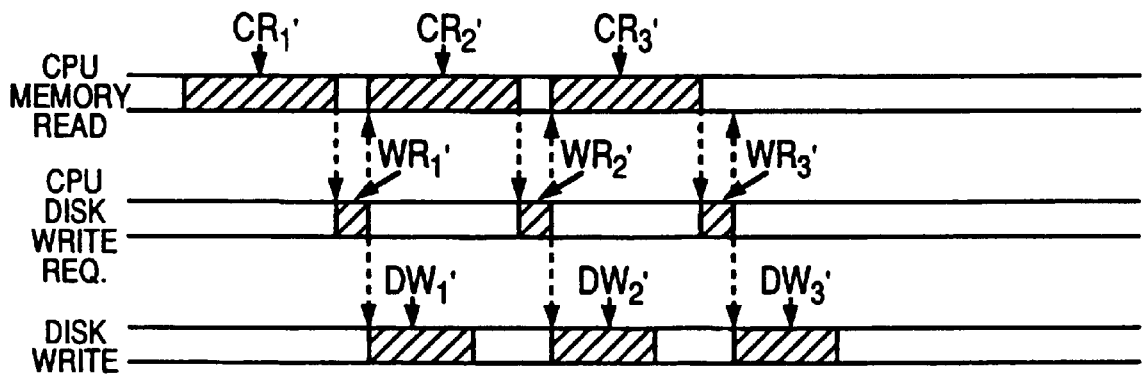
FIG. 10b shows three complete LBPI disk write cycles wherein the CPU Memory Read is slower than the Disk Write.

FIG. 10b shows three complete LBPI disk write cycles wherein the CPU Memory Reads $CR_1'$, $CR_2'$ & $CR_3'$ are slower than the Disk Writes $DW_1'$, $DW_2'$ & $DW_3'$ in accordance with the invention. On disk write operations, because of the Posted-Write capability of the LBPI 3, there is also system level concurrency. The Posted-Write operation begins with a CPU Memory Read $CR_1'$. This is followed by a transfer into the LBPI's 3 Data Out Latch 61 when the LBPI 3 receives a Disk Write Request $WR_1'$ command from the CPU 1. Next the LBPI 3 transfers the data to the disk drive followed by a Disk Write $DW_1'$. In the meantime, the CPU 1 is allowed to simultaneously perform a CPU Memory Read $CR_2'$ and read the next "chunk" of data from the CPU memory, thereby starting the sequence over.

Referring back to FIG. 7, the system handshaking between the CPU 1 and the LBPI 3 for a disk write occurs in the following manner. When the LBPI 3 finds write address match in the IDE hard disk range, it pulls the LDEV line of the CPU Bus Interface 52 low. This signals the CPU 1 that there is a CPU local bus device that wants access to the CPU 1 and has the effect of preempting a conventional ISA Bus cycle. When the CPU data is valid, it is latched into the Data Out Latch 61. Upon latching the data, the LBPI 3 releases the CPU 1 by signalling on the LRDY line and the CPU 1 is able to start a new operation on the CPU local bus. The data is then transferred by the LBPI 3 to the disk drive in 16-bit "chunks" through a Data Out MUX 62. The appropriate data transfer rate is regulated by the disk drive parameters stored in the Configuration Register 51. The LBPI 3 is capable of sending different "chunk" sizes to the disk drive if required.

Figure 11A:
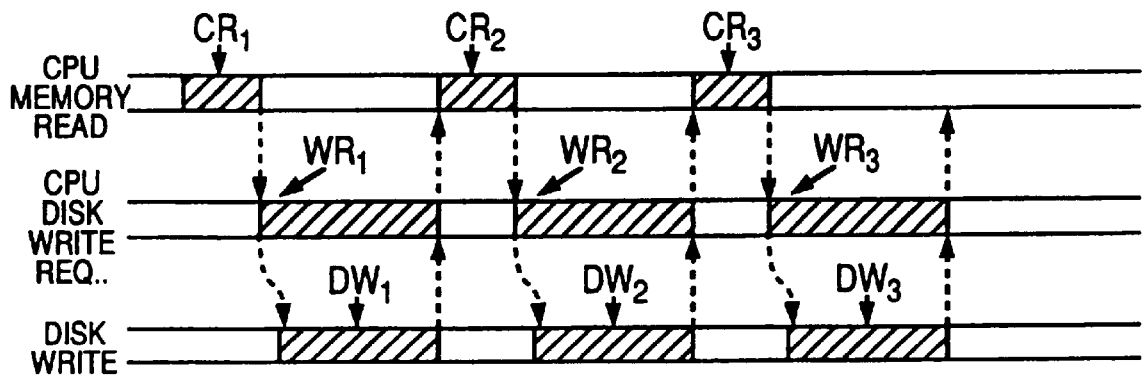
FIG. 11a shows three complete conventional ISA Bus disk write cycles wherein the CPU Memory Read is faster than the Disk Write (PRIOR ART).

FIG. 11a shows three complete conventional ISA Bus disk write cycles wherein the CPU Memory Reads $CR_1$, $CR_2$ & $CR_3$ are faster than the Disk Writes $DW_1$, $DW_2$ & $DW_3$, using programmed I/O via the ISA Bus in a conventional PC system today. The sequence of events are performed in a very similar serial manner to that of FIG. 10a except now the CPU Memory Read is faster than the Disk Write.

Figure 11B:
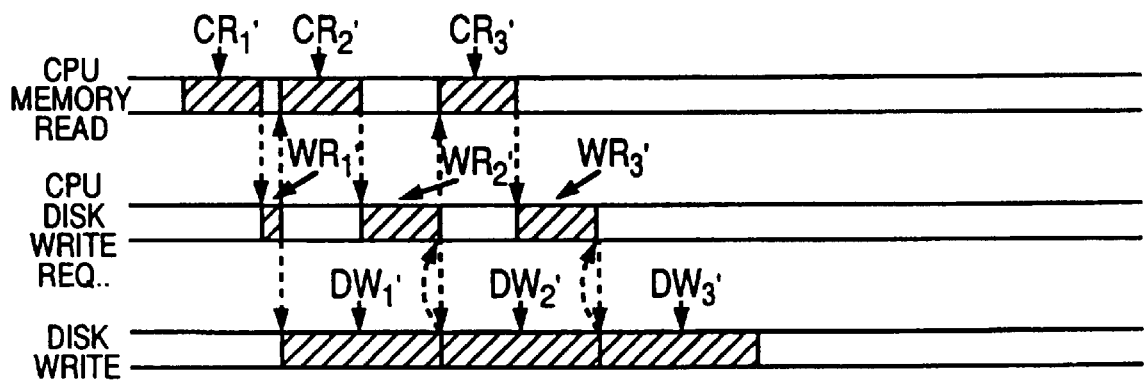
FIG. 11b shows three complete LBPI disk write cycles wherein the CPU Memory Read is faster than the Disk Write.

FIG. 11b shows three complete LBPI disk write cycles wherein the CPU read is faster than the disk write. Again, the sequence of events are performed in a very similar manner to that of FIG. 10b except now the CPU Memory Read is faster than the Disk Write.

In some embodiments, one or both the LBPI read-ahead and posted-write capabilities can be extended from the one 32-bit double word register (it offers the lowest cost with the greatest relative system performance gain) to multiple words, full disk sectors (typically 512 bytes), multiple sectors, full disk tracks, and even multiple tracks. These variations would require a larger register or increased memory capability, either inside or external to LBPI 3.

The LBPI 3 features both a 32-bit host CPU data path and a standard 16-bit IDE (ATA) disk drive data path. The 32-host interface provides capabilities for additional IDE disk drive operations. In a conventional PC system, the IDE disk drives are limited to a 16-bit data bus and there appears to be no obvious advantage in having a 32-bit CPU local bus interface, with the LBPI 3 providing the capability to assemble (or disassemble for a write) two 16-bit words into a 32-bit double-word for transfers with the CPU 1. However, a disk data read transfer is always a read-from-disk, followed by a write-to-memory (or vice versa for a disk write operation). This means that the CPU 1 with a 32-bit LBPI 3 only needs to perform a quarter as many transfer cycles as in a conventional implementation, thereby significantly boosting overall performance.

Yet another unique feature of the LBPI 3 advantageous to the operation of 32-bit host transfers is the ability to freeze (or maintain) a fixed address to the IDE data port. In a conventional PC, the IDE data port for the disk drive is located at I/O address 01F0H. Within the 80×86 family CPU architecture of a conventional PC a double-word of data is typically split into 4 bytes of data each with a contiguous but different address. Thus a 32-bit transfer to an 8-bit device would normally generate 4 cycles at I/O address addr+0, addr+1, addr+2 and addr+3. A conventional 32-bit transfer to the 01F0h port for a 16-bit device would result in two transfer cycles being generated, the first at address 01F0h and the second at 01F2h. Therefore, by using the conventional 16-bit transfer operation, the second word of data would not reach the 01F0h register where it is needed for a proper 32-bit data transfer from the CPU 1 to the selected disk drive 10 or 11.

The LBPI 3 solves this problem by identifying a 32-bit data transfer beginning at address 01F0h. When this condition is identified the LBPI 3 responds by fixing the IDE bus address at 0h (note that there is only a 3-bit address outputted to the disk) and transferring all data requested by the CPU 1 (in two word cycles or four byte cycles as specified by the drive). This feature is implemented so that byte transfers to the disk drive configuration registers at addresses 01F1h, 01F2h and 01F3h are properly processed. The apparent conflict in addresses is resolved dependent upon the 4 byte enable signals BE0, BE1, BE2 and BE3 provided by the CPU 1.

Figure 5:
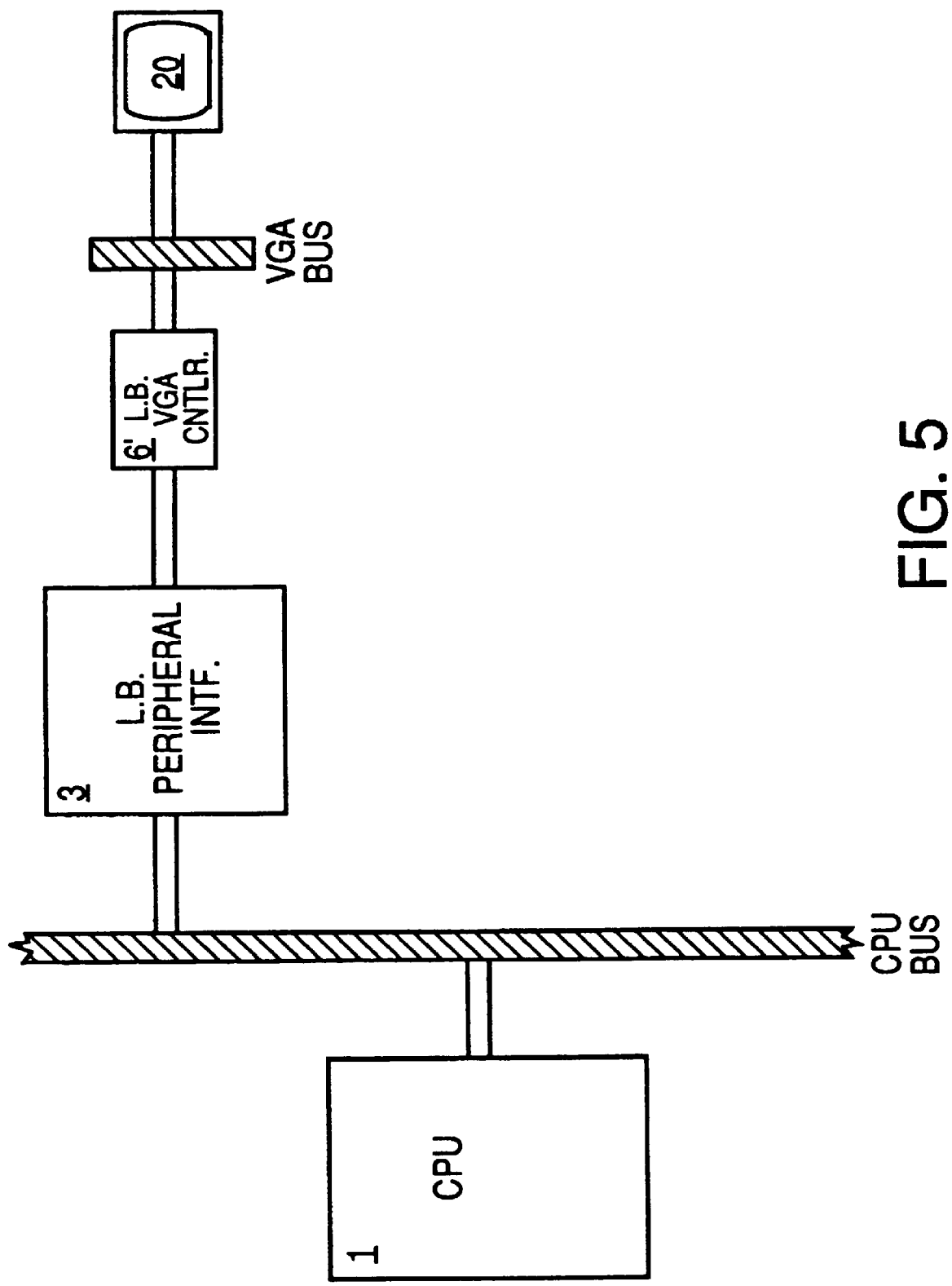
FIG. 5 shows a block diagram of a second embodiment of a LBPI between a CPU and a graphics device.

FIG. 5 shows a block diagram of a second embodiment of a Local Bus Peripheral Interface between a CPU and a graphics device interface in accordance with the invention. The principles of the efficient modes of pipelined read/write operations, described above in greater detail for the first embodiment having an IDE interface, are equally applicable to a graphics device interface such as VGA or SVGA.

Figure 6:
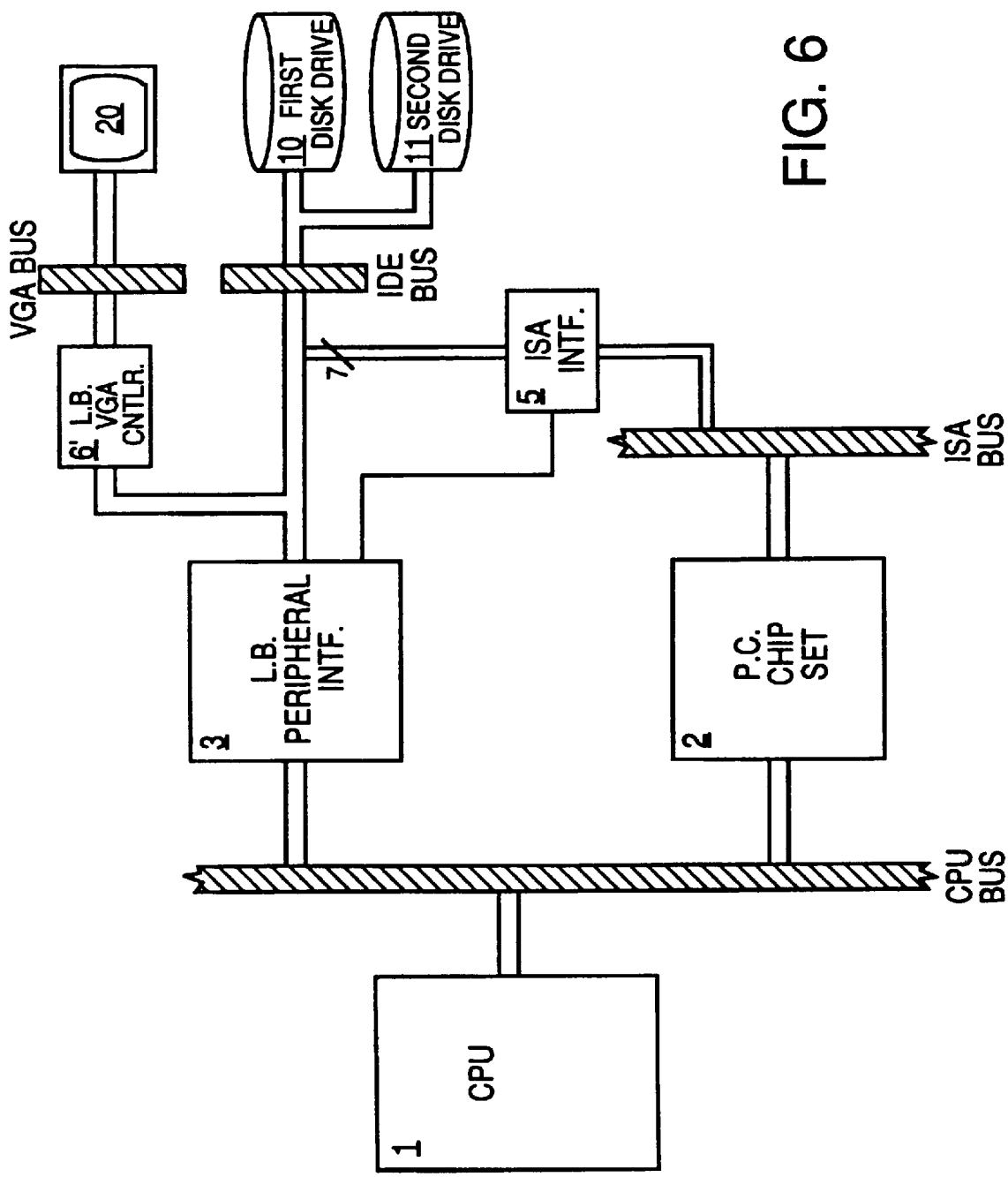
FIG. 6 shows a block diagram of a third embodiment of a LBPI between a CPU and a pair of hard drives and a graphics device.

FIG. 6 shows a block diagram of a third embodiment of a Local Bus Peripheral Interface between a CPU and a pair of hard drives and a graphics device.

While three embodiments of this invention have been described, this description is not intended to be limiting and other embodiments will be obvious to those skilled in the art based on this disclosure. Thus, while this invention has been described using an 80×86 type microprocessor architecture and the IDE Bus and/or VGA Bus, the principles of this invention apply equally to the use of a local bus peripheral interface between a computer and any peripheral device(s) including but not limited to magnetic or optical storage systems and display devices in a computer with a non-80×86 type system architecture.

We claim:

1. A method for transferring data between a computer bus and a peripheral bus using an interface device coupled between said computer bus and said peripheral bus, said method comprising the steps of:

said interface device receiving from said computer bus a request for an nth datum;

reading and storing into said interface device said nth datum from said peripheral bus;

transferring said n+1th datum stored in said interface device to said computer bus in response to a request for said n+1th datum transmitted over said computer bus; and reading an n+2th datum from said peripheral bus before said computer bus transmits a request for said n+2th datum, said step of reading an n+2th datum being performed at least partially while performing said transferring step, said n+2th datum having an address adjacent to the address of said n+1th datum.

* * * * *